US012297686B2

(12) United States Patent
Abrahamsson et al.

(10) Patent No.: US 12,297,686 B2
(45) Date of Patent: May 13, 2025

(54) SECTIONAL DOOR OPERATOR SYSTEM

(71) Applicant: Assa Abloy Entrance Systems AB, Landskrona (SE)

(72) Inventors: Magnus Abrahamsson, Loddekopinge (SE); Petter Myhrman, Lund (SE); Anton Hansson, Kivik (SE); Johan Kjessler, Lund (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 57 days.

(21) Appl. No.: 17/414,131

(22) PCT Filed: Dec. 17, 2019

(86) PCT No.: PCT/EP2019/085507

§ 371 (c)(1),
(2) Date: Jun. 15, 2021

(87) PCT Pub. No.: WO2020/127166

PCT Pub. Date: Jun. 25, 2020

(65) Prior Publication Data

US 2022/0049538 A1 Feb. 17, 2022

(30) Foreign Application Priority Data

Dec. 19, 2018 (SE) .................................... 1830366-9

(51) Int. Cl.
*E05F 15/67* (2015.01)

(52) U.S. Cl.
CPC ........... *E05F 15/67* (2015.01); *E05Y 2400/41* (2013.01); *E05Y 2600/46* (2013.01)

(58) Field of Classification Search
CPC ...... E05F 15/67; E05F 15/60; E05Y 2400/41; E05Y 2600/46
See application file for complete search history.

(56) References Cited

U.S. PATENT DOCUMENTS 4,732,203 A * 3/1988 Alten ...................... E05F 15/67 160/188
5,711,112 A 1/1998 Barten
(Continued)

FOREIGN PATENT DOCUMENTS

DE 10349904 10/2004
EP 1431500 6/2004

OTHER PUBLICATIONS

Swedish Search Report in 1830366-9, dated Jun. 20, 2019.
International Search Report in PCT/EP2019/085507, mailed Mar. 31, 2020.

*Primary Examiner* — Janet M Wilkens
*Assistant Examiner* — Susan M. Heschel
(74) *Attorney, Agent, or Firm* — Wissing Miller LLP

(57) ABSTRACT

A sectional door operator system (I) opens and closes an opening (2) by operating a plurality of horizontal and interconnected sections (9*a*-*e*) that form a sectional door. A door frame (3) is formed by first frame section (4) at a first side (5) of the opening (2) and a second frame section (6) at a second side (7) of the opening (2). The plurality of horizontal and interconnected sections (9*a*-*e*) are connected to the door frame (3) to move between an open and a closed position. A drive unit (IO) is mounted on a section (9*e*) of the door. The drive unit (IO) is arranged to move the sectional door (8) from the closed position (C) to the open position (0). The drive unit (IO) includes a first motor (I la) and a second motor (I lb, which are mounted at different vertical sides of the horizontal and interconnected section (9*e*). A control unit (20) controls the operation of the drive unit (IO). A first sensing element (30*a*) and a second sensing element (30*b*) provide operational data of the first and second motor (1 *la,* 1 *lb*) to the control unit (20).

14 Claims, 10 Drawing Sheets

(56) References Cited

U.S. PATENT DOCUMENTS

| | | | | |
|---|---|---|---|---|
| 5,918,418 | A * | 7/1999 | Richmond | E05F 15/684 49/139 |
| 6,422,965 | B1 | 7/2002 | Balli | |
| 8,453,707 | B2 * | 6/2013 | Lambridis | E06B 9/70 160/188 |
| 8,458,956 | B2 * | 6/2013 | Hoermann | E05F 15/668 49/199 |
| 9,834,976 | B2 * | 12/2017 | Balder | G05B 15/02 |
| 10,808,445 | B2 * | 10/2020 | Hucker | E05F 5/027 |
| 2006/0076114 | A1 | 4/2006 | Reider | |
| 2007/0262739 | A1 | 11/2007 | Anderson | |
| 2011/0108213 | A1 * | 5/2011 | James | E05D 15/244 160/231.1 |
| 2013/0112357 | A1 | 5/2013 | Gontarski et al. | |
| 2017/0120734 | A1 * | 5/2017 | Westerdale | B60J 5/108 |
| 2018/0266172 | A1 | 9/2018 | Wray et al. | |

* cited by examiner

SECTIONAL DOOR OPERATOR SYSTEM

This application is a 371 of PCT/EP2019/085507 filed on Dec. 17, 2019, published on Jun. 25, 2020 under publication number WO 2020/127166, which claims priority benefits from Swedish Patent Application No. 1830366-9, filed on Dec. 19, 2018, the disclosure of which is incorporated herein by reference.

TECHNOLOGY FIELD

The present invention relates to a door operator system for opening and closing an opening.

BACKGROUND

A door operator system for a sectional door typically comprises a door connected to a door frame and a drive unit arranged to move the door along the door frame between an open and closed position for opening and closing the opening. A sectional door are typically used as garage doors or as an industrial door. The drive unit could comprise a motor or a mechanical unit such as a spring to move the door.

There is a need for a more efficient door operator system that reduces the complexity and the risks of the door operator system during operation, maintenance and installation.

SUMMARY

An object of the present disclosure is to provide a door operator system which seeks to mitigate, alleviate, or eliminate one or more of the above-identified deficiencies in the art and disadvantages singly or in any combination.

An object of the present invention is to reduce the complexity of the door operator system.

An object of the present invention is to obtain a door operator system that is less sensitive to structural damage to the mechanical parts of the door system.

A further object is to improve the opening/closing process of the door panel of the door operator system to reduce or eliminate irregularities in the opening and closing operation.

In this disclosure, a solution to the problem outlined above is proposed. In the proposed solution, a sectional door operator system for opening and closing an opening is described.

In a first aspect, a sectional door operator system for opening and closing an opening is provided. The sectional door operator system comprises a door arranged to be moved between an open and closed position and comprising a plurality of horizontal and interconnected sections, a door frame comprising a first frame section at a first side of the opening and a second frame section at a second side of the opening, wherein the plurality of horizontal and interconnected sections are connected to the door frame, a drive unit mounted on a horizontal and interconnected section of the plurality of sections, wherein the drive unit is arranged to move the sectional door from the closed position to the open position, wherein the drive unit comprises at least a first motor and a second motor and wherein the first motor and the second motor are mounted at different vertical sides of the horizontal and interconnected section, a control unit being in operative communication with the drive unit and configured to control the operation of the drive unit, and at least a first sensing element and a second sensing element configured to provide operational data of the first and second motor to the control unit.

Benefits with the present invention comes from the realisation that the two motors should not be treated as having a master-slave relationship where the first motor is the master and the second motor is the slave. The master-slave relationship has the drawback that the there is no feedback from the "slave motor" if it is that motor that is having a problem. The present invention solves the problem of not achieving feedback, in that operation data is collected from both motors, and then individually controlled by the control unit based on said operation data.

The present invention is also beneficial in that it overcomes the problems related to mechanical synchronisation of the motors, as have been a solution in prior art systems, since the solution presented herein is not as sensitive to structural damage to the mechanical parts of the door system.

Yet another benefit of the present invention is that the "drawer effect" is prevented when the door is opened/closed. The "drawer effect" can be seen as the problem occurring when a person is opening or closing a chest of drawers having multiple parallel, horizontal drawers stacked on above another and one of the drawers is not drawn out equally at each side. If there is an uneven force applied to the drawer it may get stuck and the friction against the walls of the chest of drawers increases, making it difficult to remove. Using the control unit in the present invention together with the two motors, this phenomenon is prevented as the operation of the motors are continually adapted.

The first and second sensing elements may be position sensors or encoders.

The first sensing element may be arranged in conjunction with the first motor and the second sensing element may be arranged in conjunction with the second motor.

In one embodiment, the control unit is configured to control the operation of the drive unit by receiving operational data relating to the first motor, receiving operational data relating to the second motor, and evaluating said received operational data, and based on said evaluation, control the operation of the first motor and/or the second motor.

The step of controlling the operation of the first motor or the second motor may comprise altering the speed of the first motor or the second motor. In one embodiment the step of controlling the operation of the first motor or the second motor may comprise altering the speed of the first motor and/or the second motor.

The step of evaluating said received operational data may comprise determining if there is a deviation between the operational data of the two motors that is above a maximum deviation threshold. In one embodiment, if there is a deviation, the speed of the first motor or the second motor is altered and else the speed of the first motor and the second motor is maintained. In one embodiment, if it is determined that there is a deviation in position between the first motor and the second motor it is determined which of the motors that are the furthers away from a target position, and wherein if the second motor is determined to be further away from a target position than the first motor, the speed of the first motor will be reduced and if the first motor is determined to be further away from a target position than the second motor, the speed of the second motor will be reduced.

The operational data may comprise information related to the position of the motor(s).

The control unit may further be configured to determine if the actual position of the respective motors is equal to a target position, and if so the control unit may be configured to stop the operation of both motors.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something in this document is intended to mean the same as the entity being "configured for", or "intentionally adapted for" doing this very something.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
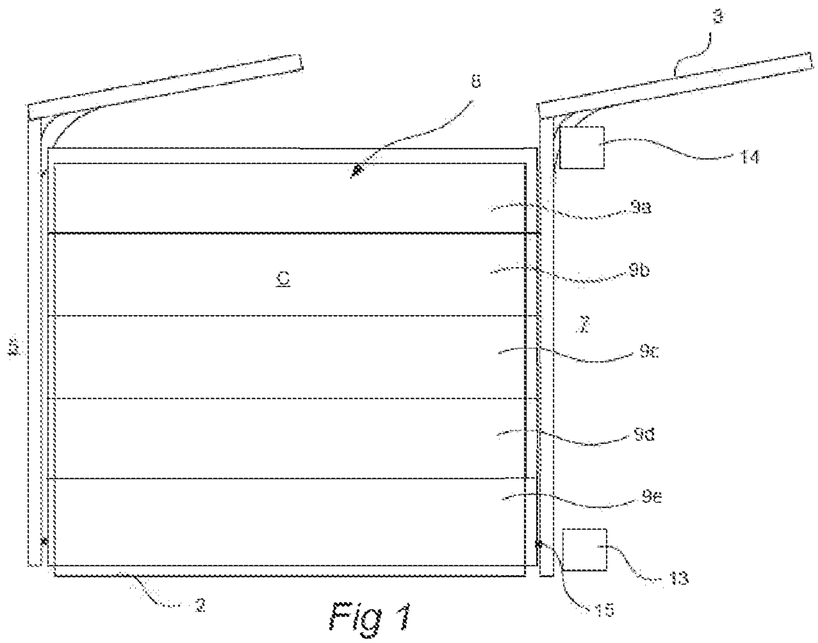
FIG. 1 is a schematic perspective view of a door operator system comprising a sectional door in a closed position.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIGS. 1-11 and 15*a*-*b* all illustrates a sectional door operator system. However, as should be understood by a person skilled in the art, the inventive aspects of the present invention are also applicable to a door operator system that is a single blade door operator system.

Figure 2A:
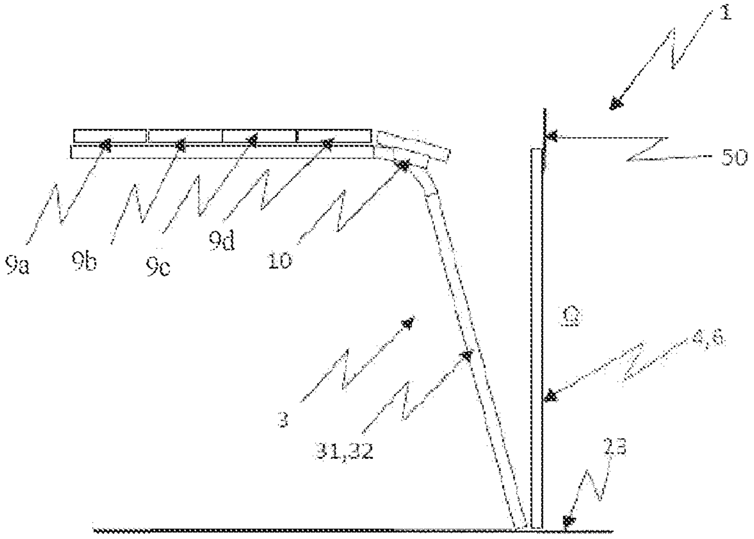
FIG. 2*a* is a schematic side view of a door operator system comprising a sectional door in an open position.
Figure 2B:
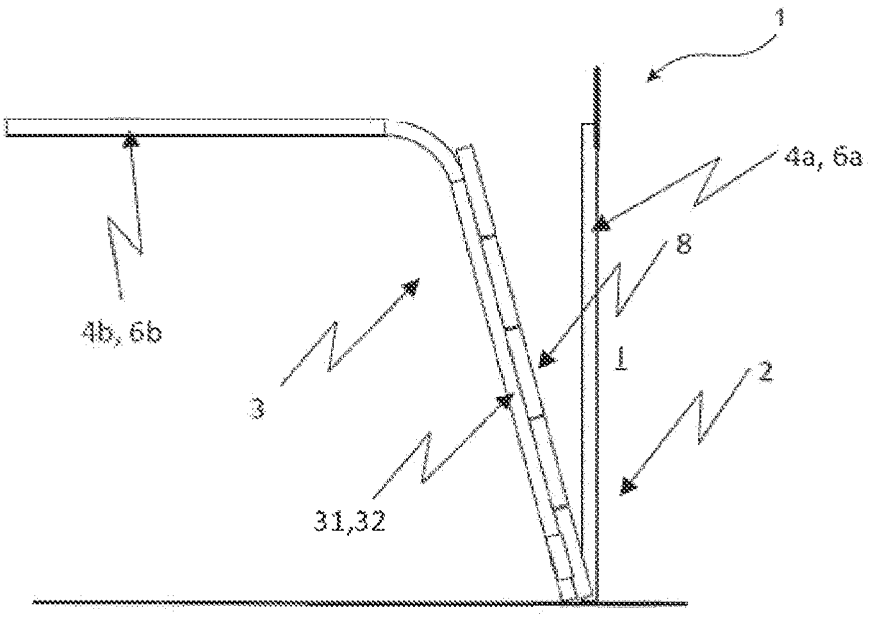
FIG. 2*b* is a schematic side view of a door operator system comprising a sectional door in an intermediate position.
Figure 2C:
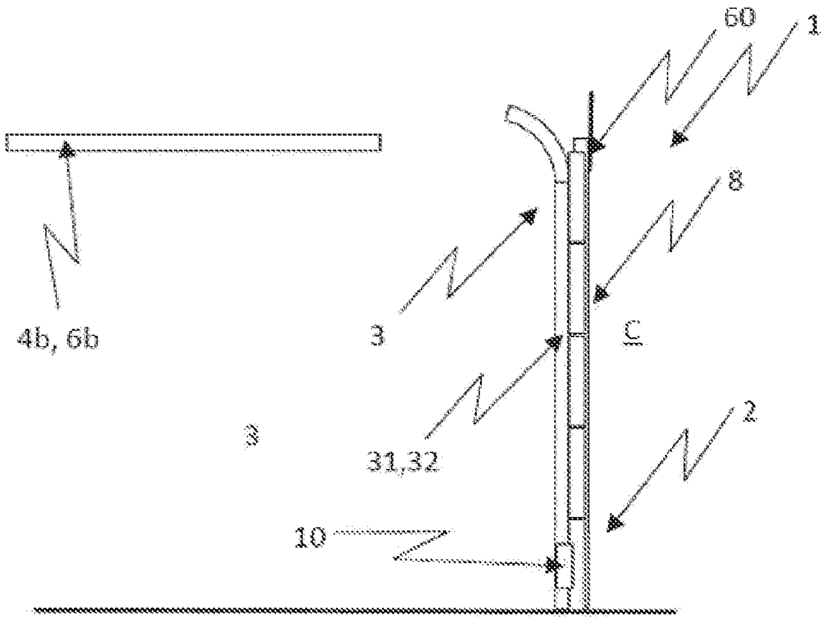
FIG. 2*c* is a schematic side view of a door operator system comprising a sectional door in a closed position.
Figure 3:
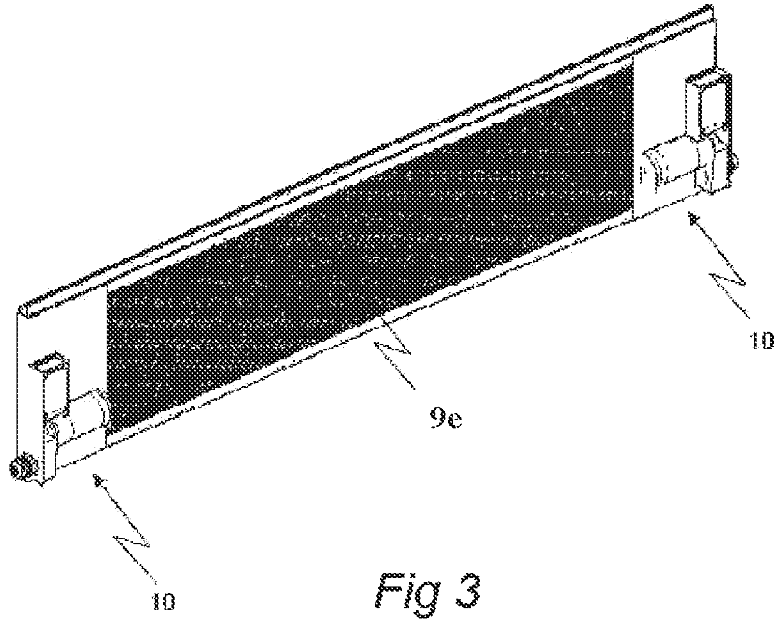
FIG. 3 is a schematic view of a section of a sectional door and a drive unit generally according to the present invention.
Figure 4:
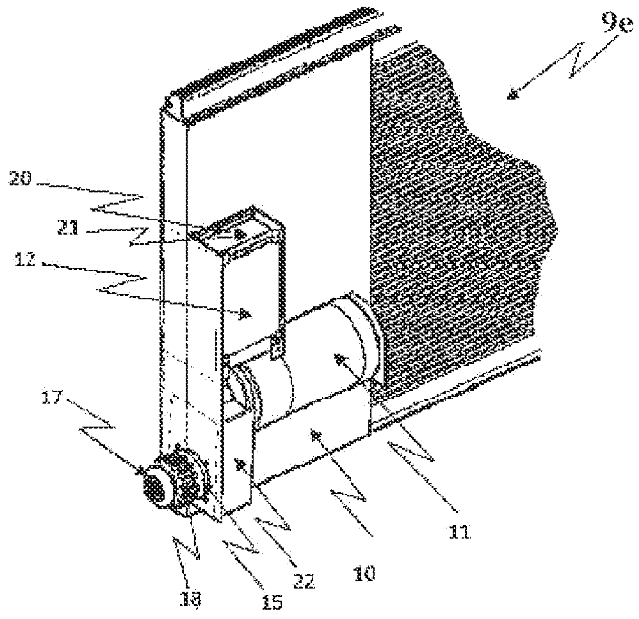
FIG. 4 is a schematic view of a part of the section of a sectional door and the drive unit shown in FIG. 3.
Figure 5:
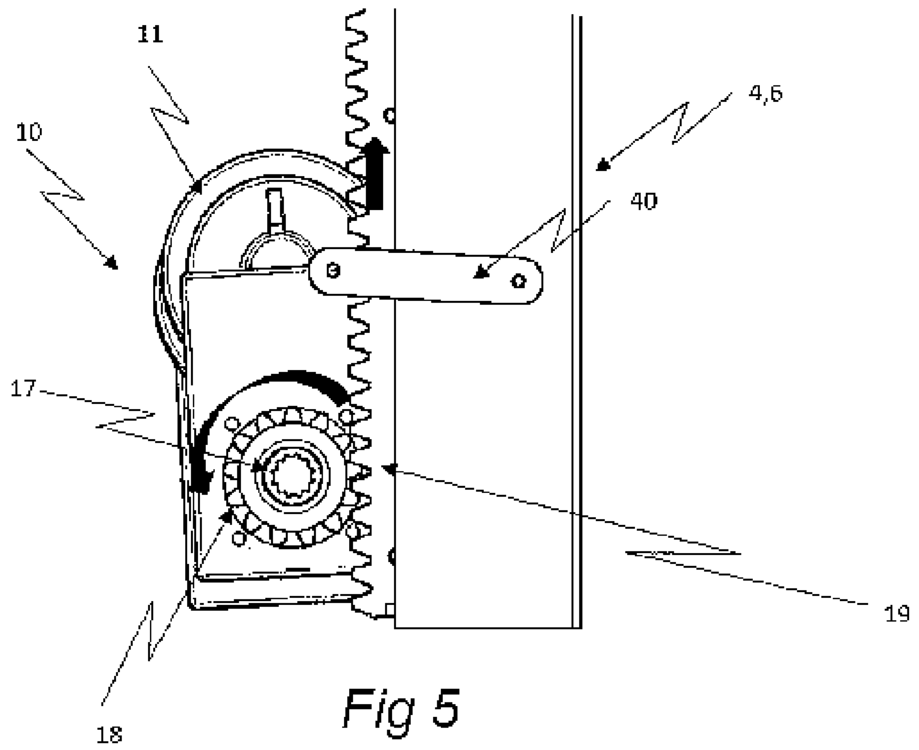
FIG. 5 is a schematic view of the connection between the door frame and the drive unit.

FIGS. 1-2 are schematic views of a door operator system 1 in which the inventive aspects of the present invention may be applied. The door operator system comprises a door frame 3, a drive unit 10 and a door 8. The door operator system 1 is arranged to be installed in an opening 2 defined by a wall 50 and a floor 23. The door operator system 1 is arranged to open and close the opening 2 by moving the door 8 between an open position O, as disclosed in FIG. 2*a*, and a closed position C, as disclosed in FIGS. 1 and 2*c*.

In this embodiment, the door 8 is a sectional door 8 comprising a plurality of horizontal and interconnected sections 9*a*-*e* connected to the door frame 3. In one embodiment, the door is a garage door. In an alternative embodiment, the door is an industrial door. The door 8 is arranged to be moved along the door frame 3 between the closed position C and the open position O.

In one embodiment, the door operator system is an up and over door operator system. A up and over door operator system is a system in which the door in the closed position C is arranged substantially vertical and in the open position O is arranged substantially horizontal and inside of the opening.

In an alternative embodiment, the door operator system is an up and up door operator system. A up and up door operator system is a system in which the door in the closed position C is arranged substantially vertical and in the open position O is arranged substantially vertical above the opening.

The door frame 3 comprise a first frame section 4 at a first side 5 of the opening 2 and a second frame section 6 at a second side 7 of the opening 2. The door frame 3 is connected to the wall 50 and to the floor 23. The first frame section 4 comprises a substantially vertical part 4*a* and a substantially horizontal part 4*b*. The second frame section 6 comprises a substantially vertical part 6*a* and a substantially horizontal part 6*b*. The vertical part 4*a*, 6*a* and the horizontal part 4*b*, 6*b* are connected to create a path for the door 8 to glide on and a track for the drive unit 10 to interact with.

The door 8 is directly or indirectly connected to the door frame 3. The door 8 is at a first side moveably connected to the first frame section 4 and at a second side moveably connected to the second frame section 6. In one embodiment, one or more of the plurality of sections 9*a*-*e* is connected to the first frame section 4 at said first side 5 and to the second frame section 6 at said second side 7.

The drive unit 10 comprise at least a first motor 11*a* and a second motor 11*b*. The drive unit 10 may further comprises at least one battery 12. The at least one battery 12 arranged to power at least one of the motors 11*a*, 11*b* is at least connected to one of the first or second motor 11*a*, 11*b*. In one embodiment, the at least two motors 11*a*, 11*b* are connected to one battery 12. In an alternative embodiment, one or more batteries 12 are connected to each motor 11*a*, 11*b*. In yet one embodiment, the first motor 11*a* is connected to a first battery and the second motor 11*b* is connected to a second battery. The drive unit 10 is connected and/or mounted to the door 8. In one embodiment, as will be described more in relation to FIG. 11, the drive unit 10 is mounted to a section 9*e*, i.e. one of said plurality of horizontal and interconnected sections, of the door 8. The first motor 11*a* and the second motor 11*b* are arranged on the same section 9*e*. Preferably, the first motor 11*a* and the second motor 11*b* are arranged at different vertical sides of the section 9*e*. Each motor 11*a*, 11*b* is thus arranged in conjunction to the first frame section 4 and the second frame section 6, respectively.

The drive unit 10 is further connected to the door frame 3. The drive unit 10 is at a first side moveably connected to the first frame section 4 and at a second side moveably connected to the second frame section 6. Hence, the first motor 11*a* is moveably connected to the first frame section 4 and the second motor 11*b* is moveably connected to the second frame section 6. The drive unit 10 is arranged to interact with the door frame 3 to move the sectional door 8 from the closed position C to the open position O and from the open position O to the closed position C.

In one embodiment, at least one motor 11 of the first and second motor 11 is configured to brake the movement of the sectional door 8 when the sectional door 8 is moved from the open position O to the closed position C. In one embodiment, both the first and second motor 11 are configured to brake the movement of the sectional door 8 when the sectional door 8 is moved from the open position O to the closed position C.

In one embodiment the door operator system 1 further comprises, as an optional feature, at least one charging unit 13, 14. In one embodiment, as disclosed in FIG. 1, the system 1 comprises a first charging unit 13 and a second charging unit 14. The charging units 13, 14 are preferably connected to the door frame 3. The first charging unit 13 is mounted in a position that correlates with the position of the battery 12 of the drive unit 10 when the sectional door 8 is in the closed position C. The first charging unit 13 is arranged to be connected to and to charge the at least one battery 12 in the closed position. The second charging unit 14 is mounted in a position that correlates with the position of the battery 12 of the drive unit 10 when the sectional door 8 is in the open position C. The first charging unit 14 is arranged to be connected to and to charge the at least one battery 12 in the open position.

In one embodiment, at least one motor 11*a*, 11*b* of the drive unit 10 is configured to act as a generator and to charge the at least one battery 12 when the sectional door 8 is moved from the open position O to the closed position C. In one embodiment, both the first and second motor 11*a*, 11*b* of the drive unit 10 is configured to act as a generator and to charge the at least one battery 12 when the sectional door 8 is moved from the open position O to the closed position C.

In one embodiment, the at least first and second motor 11 of the drive unit 10 are direct current DC motors 11. In a preferred embodiment, the at least first and second motor 11*a*, 11*b* are brushless direct current (BLDC) motors.

At least one motor 11*a*, 11*b* of the first and second motor of the drive unit 10 may further comprise a brake 22. In one embodiment, both the first and the second motor comprises the brake 22. In one embodiment, the brake 22 is an electromagnetic brake 22. The brake 22 is arranged to control/reduce the speed of the door 8 when it is moved from the open position O to the closed position C.

Now turning to FIG. 3-10. In one embodiment, the drive unit 10 comprise at least a first and second pinion 18, wherein the first pinion 18 is connected to the first motor 11*a* and the second pinion 18 is connected to the second motor 11*b*. The pinions 18 are rotated by the motors 11 when the motors 11 are running. The pinions 18 rotates the motors 11 when the weight of the door 8 moves the door 8.

In one embodiment, as disclosed in FIGS. 3-10, the drive unit 10 comprise at least a first and a second wheel 17. In one embodiment, the wheels 17 are connected to the motors 11*a*, 11*b*. In an alternative embodiment, the wheels 17 are connected to the pinions 18 of the drive unit 10. The wheels 17 may be arranged to be rotated by the motors 11.

Figure 7:
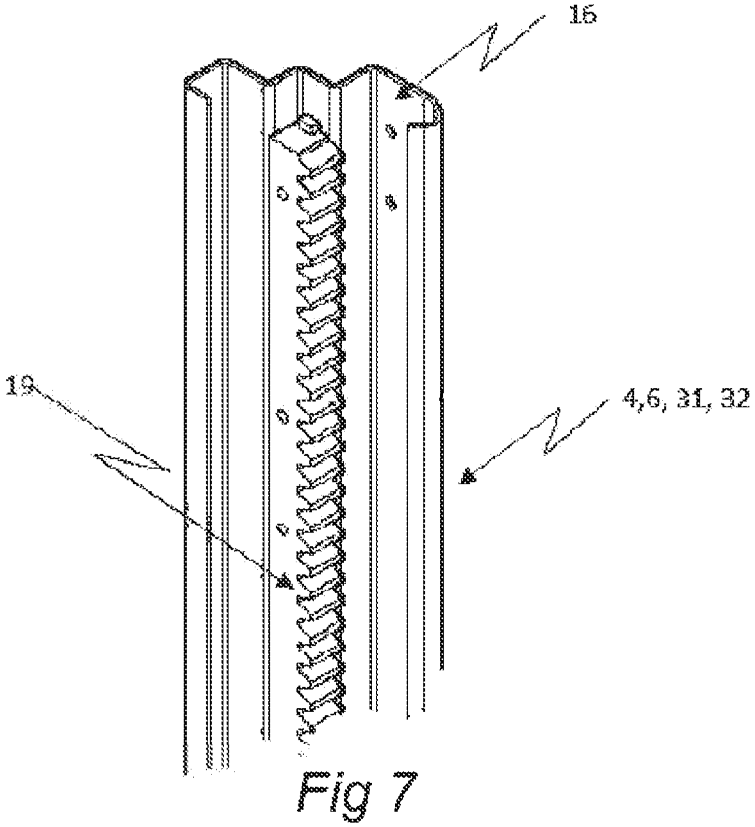
FIG. 7 is a schematic view of a part of the door frame generally according to the present invention.

In one embodiment, as disclosed in FIG. 7, the door frame 3 comprises a guide track 16. In one embodiment, the guide track 16 is connected to the first and second frame section 4, 6. In an alternative embodiment, the guide track 16 is an integrated part of the first and second frame section 4, 6.

The wheels 17 are adapted to be inserted into the guide track 16. The wheels 17 are arranged to interact with the guide track 16 and to restrict horizontal movement of the wheels 17 when the wheels 17, and thus also the drive unit 10 and the door 8, is moved between the open and closed position O, C of the door 8.

Figure 9:
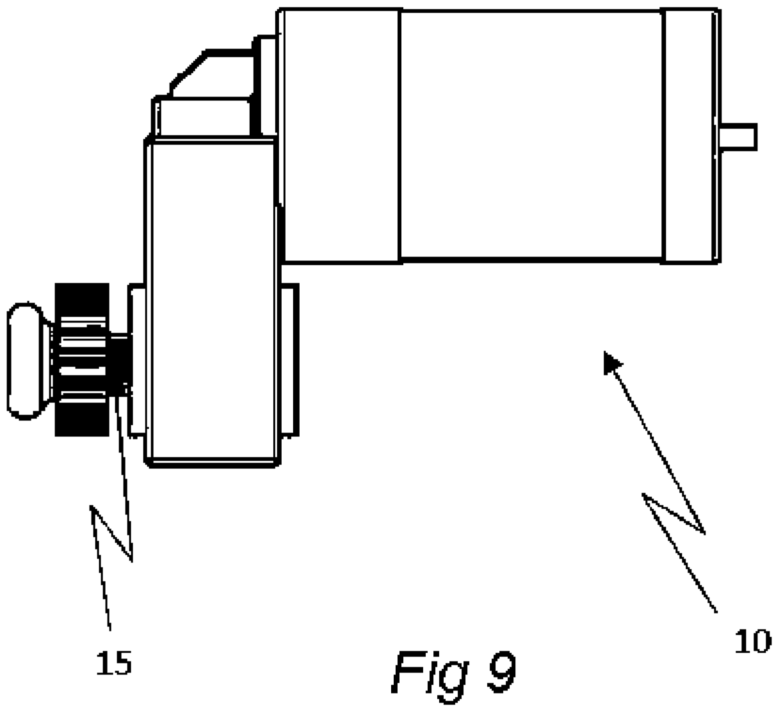
FIG. 9 is a schematic view of a drive unit comprising a spline joint in a compressed position.
Figure 10:
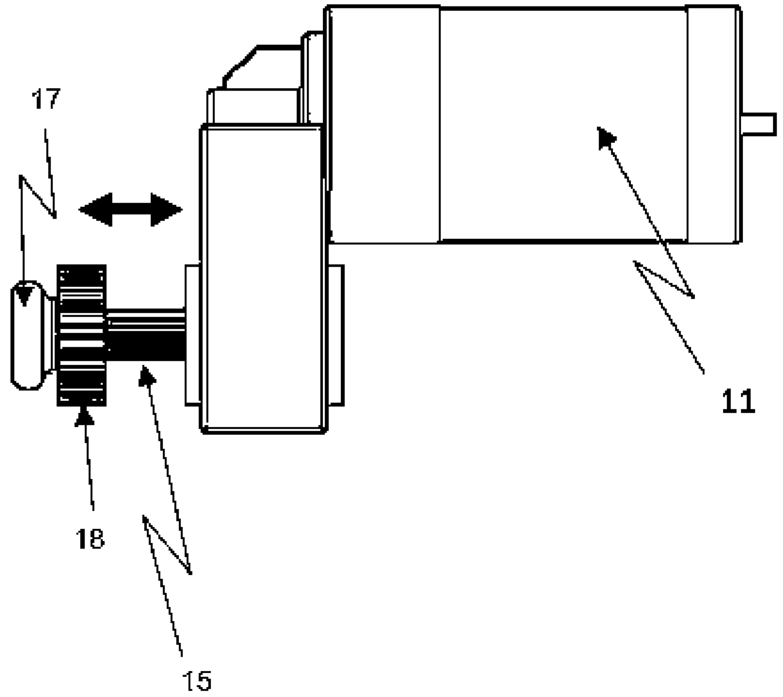
FIG. 10 is a schematic view of a drive unit comprising a spline joint in an extended position.

In one embodiment, as disclosed in FIGS. 9 and 10, the drive unit 10 comprise at least a first and a second spline joint 15. The first spline joint 15 is in one end connected to the first wheel 17 and in a second end connected to the first motor 11. The second spline joint 15 is in one end connected to the second wheel 17 and in a second end connected to the second motor 11. As the guide track 16 is arranged to restrict horizontal movement of the wheels 17 and the wheels are connected to the motors 11, the spline joints 15 will move and compensate for any horizontal movement of the drive unit 10 and the door 8 in relation to the door frame 3. The spline joints 15 will be compressed when the distance between the motors 11 and the door frame 3 decreases. The spline joints 15 will be extracted when the distance between the motors 11 and the door frame increases, as disclosed in FIG. 10.

In one embodiment, the spline joints 15 are arranged to compensate for horizontal movements of the first and second motor 11 in relation to the first and second frame section 4, 6, respectively. In one embodiment, the wheels 17 are connected to the spline joints 15 of the drive unit 10.

Figure 6:
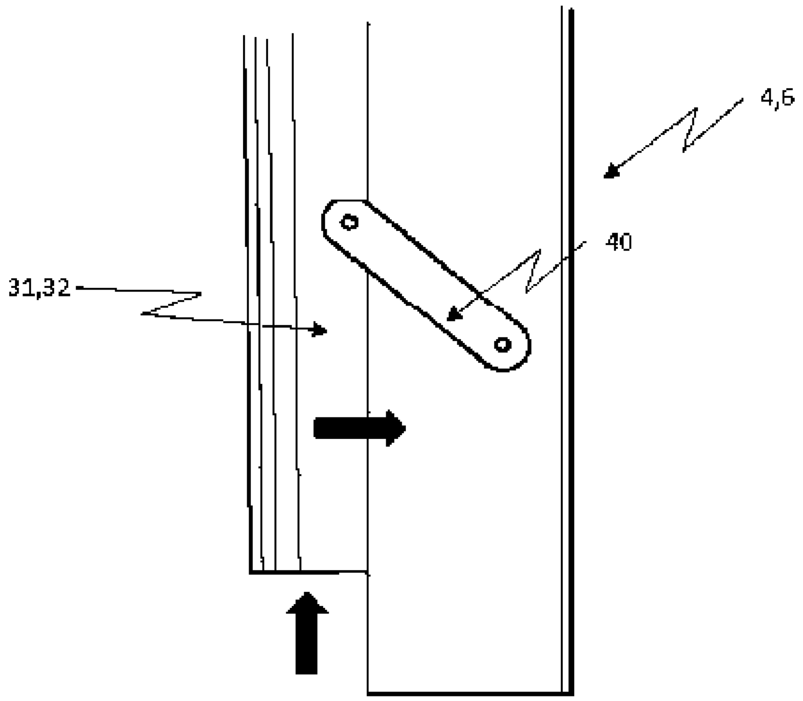
FIG. 6 is a schematic view of a part of the door frame generally according to the present invention.
Figure 8:
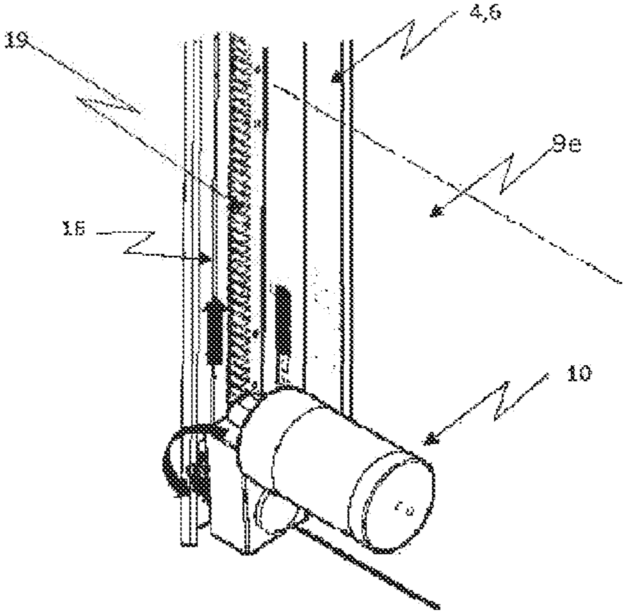
FIG. 8 is a schematic view the connection between the door frame and the drive unit generally according to the present invention.

As disclosed in FIGS. 6, 7 and 8, the door frame 3 may comprise a rack 19. In one embodiment, the first and the second frame sections 4, 6 of the door frame comprise the rack 19. The rack 19 of the door frame 3 is arranged to interact with said at least first and second pinion 18 of the drive unit 10 to move the door 8. The connection between the drive unit 10 and the door frame 3 is not restricted to a rack and pinion 18 connection and could be achieved by means of one or more of a belt drive, a magnetic drive or a friction drive. Both the first and the second frame section 4, 6 accordingly comprises the rack 18.

In one embodiment, the drive unit 10 comprise one or more sensors (not shown) arranged to identify a person or object in the path of the door 8 and to interrupt or reverse the movement of the door 8 when identifying the person or object. The one or more sensors may be one or more of a pressure sensor, an IR-sensor, a camera, a radar or a presence sensor.

Figure 11:
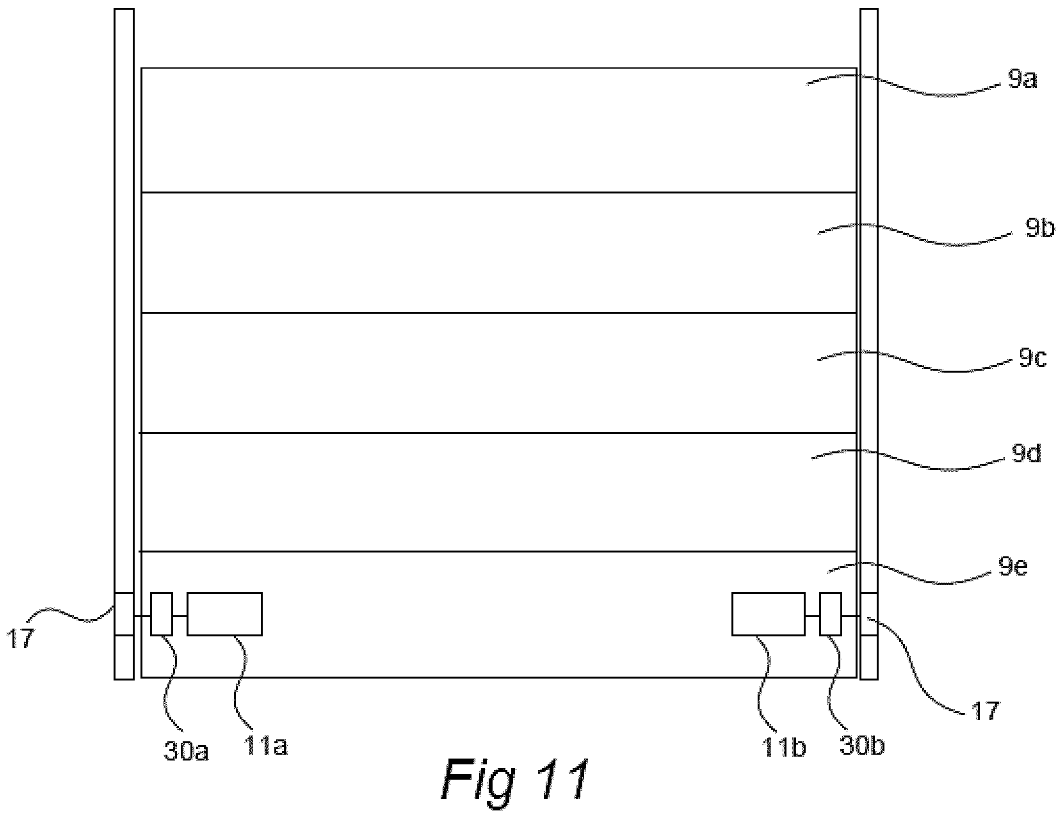
FIG. 11 is a schematic perspective view of a door operator system comprising a sectional door in a closed position.
Figure 12:
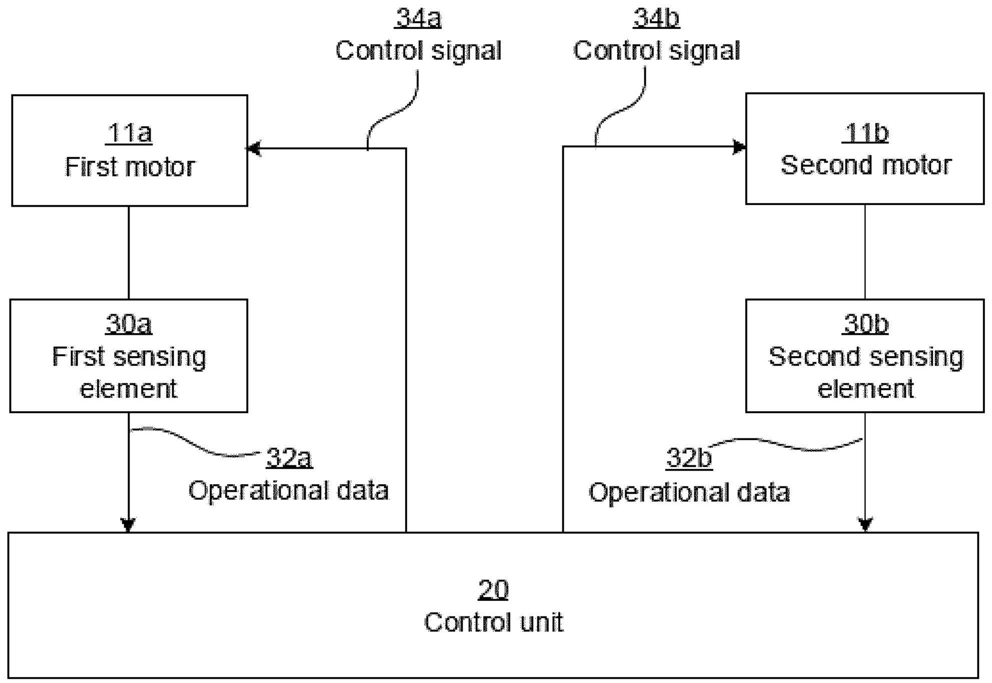
FIG. 12 is a schematic block diagram representing parts of a door operator system according to the present invention.

As is shown and will be described more in detail with reference to FIGS. 11 and 12, the door operator system 1 further comprises at least two sensing elements 30*a*, 30*b*. It should be noted that the sensing elements 30*a*, 30*b* are present, although not shown, also in the embodiments illustrated in FIG. 3-10. In an embodiment where the system 1 comprises a first and a second motor 11*a*, 11*b* the system 1 further comprises a first and a second sensing element 30*a*, 30*b*. Each sensing element 30*a*, 30*b* is arranged in conjunction to a respective motor 11*a*, 11*b*.

The control unit 20 is in operative communication with the drive unit 10. The control unit 20 is configured to control the movement of the drive unit 10, i.e. when and how the drive unit 10, and its associated motors 11*a*, 11*b*, should move the door 8. The control unit 20 is arranged to receive input of if the door 8 should be opened or closed. In one embodiment, the control unit 20 is arranged to receive the input from one or more of a user interface, a mechanical button or a remote control. As will be described more with reference to FIGS. 11 to 15, the control unit 20 is configured to control the operation of the at least first and second motors 11*a*, 11*b*. In a preferred embodiment, the control unit 20 is configured to control and adjust the operating speed of one or all of the motors 11*a*, 11*b* in response to position data.

As is shown and will be described more in detail with reference to FIGS. 11 and 12, the door operator system 1 further comprises at least two sensing elements 30*a*, 30*b* and a control unit 20. The data gathered from the sensing elements 30*a*, 30*b* are used to determine the operation of the motors 11*a*, 11*b*.

The control unit 20 is in operative communication with the drive unit 10. The control unit 20 may be in wired communication with the two motors 11*a*, 11*b* or be in a wireless communication. The control unit 20 may further be in operative communication with the sensing elements, the communication may either be wired or wireless. The sensing element may further be a part of the control unit 20.

The control unit 20 is configured to control the movement of the drive unit 10, i.e. when and how the drive unit 10, and its associated motors 11*a*, 11*b*, should move the door 8. The control unit 20 is arranged to receive input of if the door 8 should be opened or closed. In one embodiment, the control unit 20 is arranged to receive the input from one or more of a user interface, a mechanical button or a remote control.

The control unit 20 is further configured to control the operation of the at least first and second motors 11*a*, 11*b*. In a preferred embodiment, the control unit 20 is configured to control and adjust the operating speed of one or all of the motors 11*a*, 11*b* in response to operational data gathered by the sensing elements 30*a*, 30*b*. The operation data is collected from both motors, and the motors are then individually controlled by the control unit based on said operation data. Hence, there is no master-slave relationship between the motors, since the each motor can be controlled individually. For example, the speed of the first motor may be reduced while the speed of the second motors is maintained or vice versa. It is thus possible to alter the position/speed of one of the motors to achieve the preferred situation where the motors are arranged on the same position, i.e. are in sync with each other.

In an embodiment where the system 1 comprises a first and a second motor 11*a*, 11*b* the system 1 further comprises a first and a second sensing element 30*a*, 30*b*. Each sensing element 30*a*, 30*b* is arranged in conjunction to a respective motor 11*a*, 11*b*.

In one embodiment the sensing element 30*a*, 30*b* is in the form of a sensor. The sensor could be a position sensor that is configured to determine position of the motor 11*a*, 11*b*. Additionally or alternatively, the sensor is an encoder configured to determine the position of the motor 11*a*, 11*b*. Preferably, the encoder is a rotary encoder that converts the angular position or motion of a shaft or axle in the motor to a digital output signal. The sensing element 30*a*, 30*b* could also be a part of the motor 11*a*, 11*b*. This is especially true in the case where the motors 11*a*, 11*b* are a brushless DC electric motor.

Each motor 11*a*, 11*b* is associated with one sensing element 30*a*, 30*b* configured to sense operational data of the motors 11*a*, 11*b* and to transmits said data to the control unit 20. This is illustrated in FIG. 12, showing that the first sensing element 30*a* transmits operational data 32*a* of the first motor 11*a* to the control unit 20. The second sensing element 30*b* transmits operational data 32*b* of the second motor 11*b* to the control unit 20. The control unit 20 is configured to evaluate the operational data from the first and second motor 11*a*, 11*b* and depending on the evaluation transmit a control signal to the first motor 11*a* and/or the second motor 11*b*.

Figure 13:
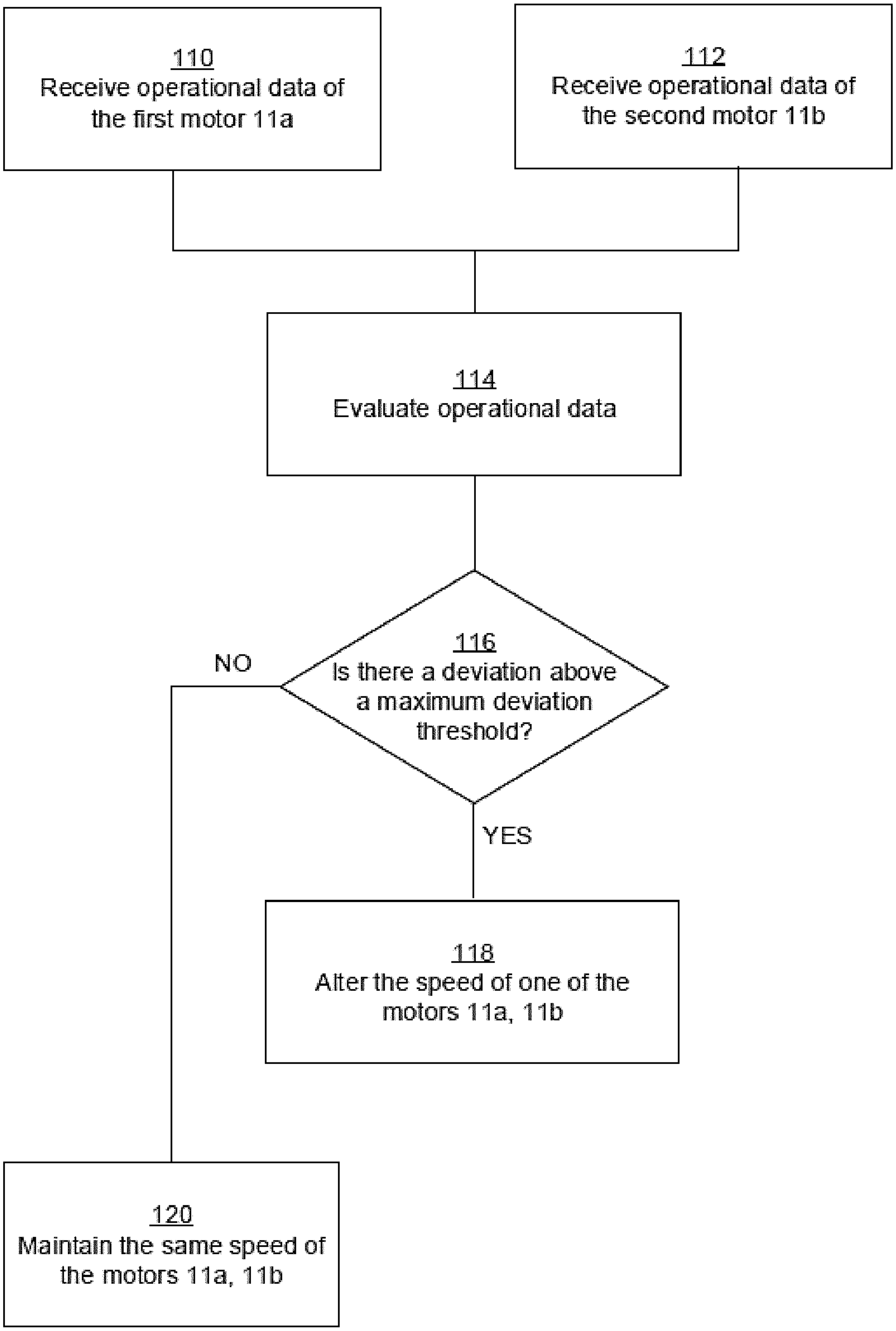
FIG. 13 is a schematic illustration of a method of a control unit arranged in the door operator system.

FIG. 13 shows a method implemented by the control unit 20 to control the operation of at least one of the motors. The control unit 20 is configured to receive 110 operational data of the first motor 11*a* and to receive 112 operational data from the second motor 11*b*. The control unit 120 is configured to evaluate 114 the operational data. In one embodiment the operational data comprises at least position data. The evaluation step may for example comprise determine the target position of the motors 11*a*, 11*b*, read the actual positions of the motors 11*a*, 11*b*, calculate the actual door position and/or calculate the deviation between the motors 11*a*, 11*b*.

In a next step, the controller 20 determines 116 if there is a deviation between the two motors 11*a*, 11*b* that is above a maximum predetermined deviation threshold. If there is a deviation between the motors the controller 20 is configured to alter 118 the speed of one of the motors 11*a*, 11*b*. The deviation may relate to a deviation in position between the two motors 11*a*, 11*b* and/or a deviation in position between the current position and the target position for the motors.

In one embodiment, if the second motor 11*b* is further away from the target position than the first motor 11*a*, the speed of the first motor 11*a* will be reduced. This allows the second motor 11*b* to catch up with the first motor 11*a* so that they are at the same position, and thus will reach the target position at the same time. In the same way, if the first motor 11*a* is further away from the target position than the second motor 11*b*, the speed of the second motor 11*b* will be reduced. This allows the first motor 11*a* to catch up with the second motor 11*b*.

In an alternative embodiment, if the second motor 11*b* is further away from the target position than the first motor 11*a*, the speed of the second motor 11*b* will be increased. This allows the second motor 11*b* to catch up with the first motor 11*a* so that they are at the same position, and thus will reach the target position at the same time. In the same way, if the first motor 11*a* is further away from the target position than the second motor 11*b*, the speed of the first motor 11*b* will be increased. This allows the first motor 11*a* to catch up with the second motor 11*b*.

If it on the other hand is determined that the deviation is below the maximum deviation threshold, the current speed of the two motors 11*a*, 11*b* will be maintained 120.

The operational data may further comprise information relating to the current of the motors 11*a*, 11*b*. The control unit 20 may further be configured to determine if the motor current of the first motor 11*a*, the second motor 11*b* and/or both the first motor 11*a* and the second motor 11*b* is above a maximum current threshold. If it is determined that the motor current is above the maximum current threshold, the control unit 20 is configured to send out an error signal and to stop both motors 11*a*, 11*b*. The control unit 20 may further be configured to initiate the brakes of the motors 11*a*, 11*b*. The information relating to the current is beneficial in order to identify if the motor is exposed to a higher load than normal. This may for example be the case if something is stuck in the door operator system 1.

The control unit 20 is further configured to determine if the actual position is equal to the target position. If it is determined that the actual position is equal to the target position, the control unit 20 will stop both the motors 11*a*, 11*b* and possibly also initiate the breaks.

Figure 14:
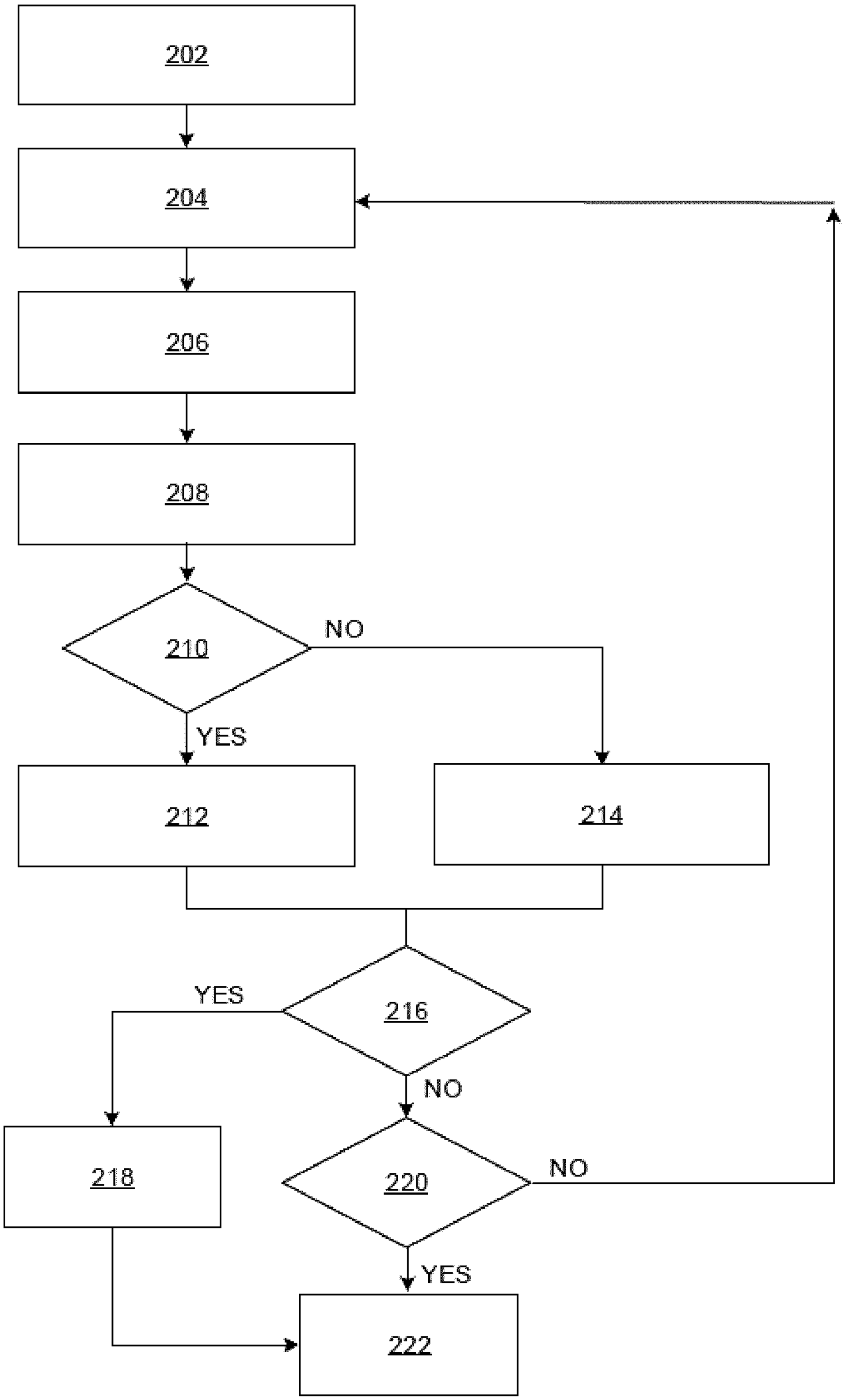
FIG. 14 is a schematic illustration of a method of a control unit arranged in the door operator system.

An embodiment of the control unit 20 is described with more details with reference to FIG. 14.

In a first step 202, the control unit 20 determines the target position of the two motors 11*a*, 11*b*. The control unit 20 continuously sets a target position and the motors 11*a*, 11*b* are individually driven to continuously achieve the target position.

In a next step 204, the actual current position of the two motors 11*a*, 11*b* are read. The actual position is read in relation to the door travel distance. This step is preferably performed by the sensing elements 30*a*, 30*b* that receives information of the position of the motors 11*a*, 11*b*. Once the position data is received, the data is used to calculate 206 the actual position of the door 8. This step is preferably performed by calculating the mean value of the read positions of the two motors 11*a*, 11*b*.

In a next step 208, the deviation between the first motor 11*a* and the second motor 11*b* is calculated. If the deviation is above predetermined threshold 210, representing a maximum normal deviation, the speed of one of the motors needs to be altered 214. The deviation is preferably related to a deviation in the current position of the two motors 11*a*, 11*b* and/or the deviation in the calculated actual position of the two motors 11*a*, 11*b*. Embodiments of the alteration of speed has already been described with reference to FIG. 13. If the deviation is below the predetermined threshold 210, the speed of the motors are not altered 212. Hence, both motors are driven with the same speed.

Once the control unit 20 has determined if the speed of the motor(s) should be altered, a next step is to determine 216 if the motor current of the first motor 11*a*, the second motor 11*b* and/or both the first motor 11*a* and the second motor 11*b* is above a maximum current threshold. If it is determined that the motor current is above the maximum current threshold, the control unit 20 is configured to send out an error signal or in some other way notify the system that an error has occur 218. Once the system have identified the error, both motors are stopped 222. The motors may be stopped by reducing the speed to zero and/or to initiate the brakes of the motors 11*a*, 11*b*.

If it is determined that the motor current is below the maximum current threshold, the control unit 20 is configured to determine 220 if the actual position is equal to the target position. If it is determined that the actual position is equal to the target position, the control unit 20 will stop 222 both the motors 11*a*, 11*b* and possibly also initiate the breaks. If it is determined that the actual position is not equal to the target position, the control unit 20 will continue back to step 204 and read the actual position of the motors.

As previously described the drive unit 10 may comprise at least the first and the second motor 11 mounted on the first section 9*e* of the door 8. The first motor 11 is moveably connected to the first frame section 4 and the second motor 11 is moveably connected to the second frame section 6. In accordance with the aforementioned, the drive unit may further comprise additional motors which will now be described further.

Figure 15A:
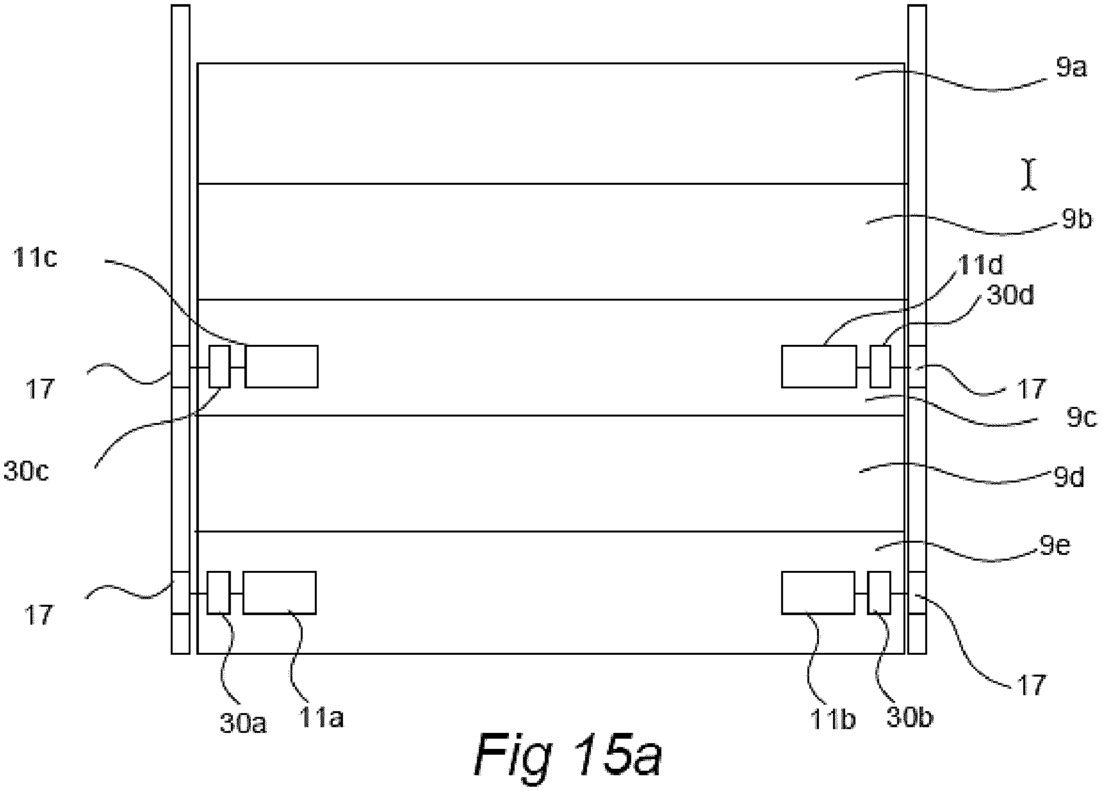
FIG. 15*a* is a schematic perspective view of a door operator system comprising a sectional door in a closed position.

In one embodiment, the drive unit 10 comprise a third and a fourth motor 11*c-d* mounted on a second horizontal section 9*c* of the horizontal sections and arranged to assist the first and second motors 11*a-b* when moving the sectional door 8 from the closed position C to the open position O. The third and fourth motors 11 are connected to the control unit 20 and arranged to be controlled by the control unit 20 in the same way as described above in relation to the first and second motor 11. In an embodiment, as shown in FIG. 15*a*, the system 1 comprises four motors 11*a-d* four sensing elements 30*a-d* and one control unit 20. The first and second motor 11*a*, 11*b* are arranged on one section 9*e* and the third and fourth motor 11*c*, 11*d* are arranged on another section 9*c*. Each sensing element 30*a-d* is arranged in conjunction to a respective motor 11*a-d*. Hence, the first and second sensing elements 30*a*, 30*b* are arranged in conjunction to the first and second motor 11*a*, 11*b* and the third and fourth sensing elements 30*c*, 30*d* are arranged in conjunction to the third and fourth motor 11*c*, 11*d*.

In one embodiment, the first and second motor 11*a*, 11*b* and the first and second sensing elements 30*a*, 30*b* are arranged on a section 9*e* that is located on the section of the door being closest to the floor 23 in the closed position C. However, it should be noted that section 9*e* could for example also be the section 9*d* which is the section being arranged next to the section being closest to the floor 23 in the closed position C.

Figure 15B:
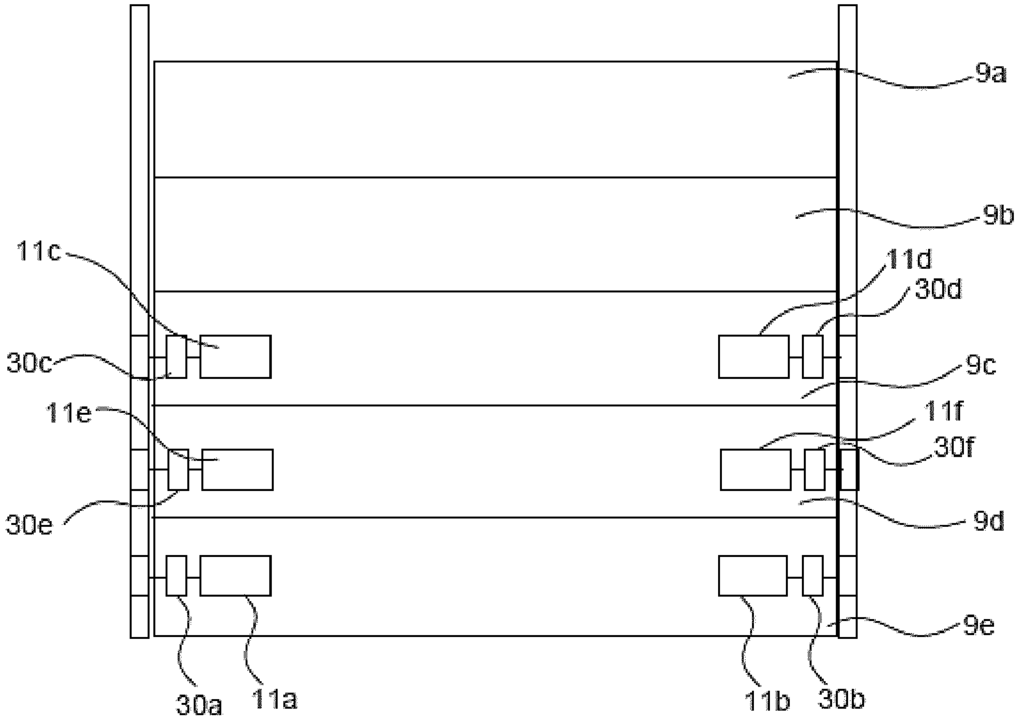
FIG. 15*b* is a schematic perspective view of a door operator system comprising a sectional door in a closed position.

In one embodiment, the drive unit 10 comprise a fifth and a sixth motor 11*e-f* mounted on a third horizontal section 9*d* of the horizontal sections 9*a-e* and arranged to assist the other motors 11 when moving the sectional door 8 from the closed position C to the open position O. The fifth and sixth motors 11*e-f* are connected to the control unit 20 and arranged to be controlled by the control unit 20 in the same way as described above in relation to the first and second motor 11*a-b*. In an embodiment, as shown in FIG. 15*b*, the system 1 comprises six motors 11*a-f* six sensing elements 30*a-f* and one control unit 20. The first and second motor 11*a*, 11*b* are arranged on one section 9*e*, the third and fourth motor 11*c*, 11*d* are arranged on another section 9*c*, and the fifth and sixth motor 11*e*, 11*f* are arranged on another section 9*d*. Each sensing element 30*a-f* is arranged in conjunction to a respective motor 11*a-f*. Hence, the first and second sensing elements 30*a*, 30*b* are arranged in conjunction to the first and second motor 11*a*, 11*b*, the third and fourth sensing elements 30*c*, 30*d* are arranged in conjunction to the third and fourth motor 11*c*, 11*d* and the fifth and sixth sensing elements 30*e*, 30*f* are arranged in conjunction to the fifth and sixth motor 11*e*, 11*f*.

In the embodiments where additional sections 9*a-e* are arranged with sensing elements and motors, these may be arranged on every other section, every section or at one section being arranged above the section 9*e*.

Hereafter a method of how the sectional door operator system 1 opens and closes the opening 2 will be described.

In the closed position C the door 8 is positioned in the opening 2 and the opening is closed. In the closed position C the first charging unit 13 charges the one or more batteries 12 of the drive unit 10. When the control unit 20 receives input of that the door 8 should be moved from the closed position C to the open position O, the control unit 20 controls the drive unit 10 to start. The input could be from a remote control or by pressing an activation button of the door operator system 1. The battery 12 powers the drive unit 10 to drive the at least first and second motor 11 that are mounted to the section 9*e* of the door 8 and connected to the door frame 3. The motors 11 rotates the pinions 18. The pinions 18 rotates and interacts with the rack 19 and the drive unit 10 and the door 8 is moved upwards, see arrows in FIG. 10. As the drive unit 10 moves the door 8 upwards, the door 8 moves in the first and second frame section 4, 6. The first and second frame section 4, 6 guides the movement of the door 8 to guide the door 8 from the closed position C to the open position O.

In one embodiment, the door 8 could be horizontal, or at least at an angle in view of the closed position C, and the door 8 is positioned inside of the opening 2 and above the opening 2. When moving from the closed position C to the open position O, the sections 9 of the door that are interconnected will push on each other such that the whole door 8 will move upwards. The sections 9 will rotate and move in relation to each other when moving from a vertical position to the horizontal position.

The control unit 10 will control the drive unit 10 to stop when the door 8 is positioned in the open position O. In the open position O the one or more battery 12 is connected to the second charging unit 14 and the second charging unit 14 charges the one or more battery 12.

In the open position O the drive unit 10 breaks the door 8 to restrict any movement of the door 8. In one embodiment, this is achieved by the motor(s) 11 acting as a generator 11 to restrict movement between the pinions 18 and rack 19 and/or the break(s) 22 is activated. The control unit 10 thereafter receives input, either as a signal or after a predetermined time after opening, of that the door 8 should be moved to the closed position C. The break(s) 22 is released and/or the battery 12 drives the at least first and second motor 11 to start moving the door 8.

In one embodiment, the sectional door operator system uses the gravity acting on the door 8 to move the door 8 from the open position O towards the closed position C. The sections 9*a-e* of the door 8 glide in the first and second frame section 4, 6 of the door frame 3. The rack 19 interacts with the pinions 18 and rotates the pinions 18 as the door 8 and the drive unit 10 is moved downwards.

In one embodiment, at least one of the first and second motor 11 is run as a generator 11 when moving the door 8 from the open position O to the closed position C. As the pinion(s) 18 are rotated the generator 11 is rotated. The generator 11 reduces the speed of the door 8. The generator 11 that is connected to the one or more battery 12 charges the one or more battery when moved by the pinion 18 and rack 19 interactions. By using the kinetic energy of the moving door 8 the battery 12 is charged. The charged energy could thereafter be stored in the battery 12 and be used for moving the door 8 from the closed position C to the open position O even if there is a power outage and the first charging unit 13 is not able to charge the battery 12. This also reduces the energy needed to operate the sectional door operator system 1.

If the one or more sensors identify a person or an object in the path of the door 8, the sensors will send a signal to the control unit 20 that will control the door 8 and stop the movement of the door 8. The control unit 20 thereafter controls the door 8 to return to the open position O or to hold until the person or object has moved and control the door to continue to the closed position. As the door 8 moves towards the floor 23 it reaches the closed position C. In the closed position C the battery 12 of the drive unit will be connected to the first charging unit 13 and the battery 12 will be charged.

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system having one or more movable door member not limited to any specific type. The or each such door member may, for instance, be a swing door member, a revolving door member, a sliding door member, an overhead sectional door member, a horizontal folding door member or a pull-up (vertical lifting) door member.

The invention claimed is:

1. A sectional door operator system for opening and closing an opening, comprising:

a door arranged to be moved between an open (O) and closed (C) position and comprising a plurality of horizontal and interconnected sections, a door frame comprising a first frame section affixed with a first side of the opening and a second frame section affixed with a second side of the opening, wherein the plurality of horizontal and interconnected sections are moveable along the door frame, wherein the first frame section comprises a first rack, and wherein the second frame section comprises a second rack, a first drive unit mounted on a horizontal section of the plurality of horizontal and interconnected sections and engaged with and moveable along the first frame section, a second drive unit mounted on the horizontal section and engaged with and moveable along the second frame section, wherein the first drive unit and the second drive unit are arranged to move the sectional door from the closed position (C) to the open position (O), wherein the first drive unit comprises at least a first motor and a first pinion gear engaged with the first rack and the second drive unit comprises at least a second motor and a second pinion gear engaged with the second rack and wherein the first motor and the second motor are mounted on opposite sides of the horizontal section adjacent the respective first and second frame sections, and wherein the first and second motors rotate the first and second pinions to move the first and second drive units along the respective first and second racks, a control unit being in operative communication with the first and second drive units and configured to independently control the operation of the first and second motors, and at least a first sensing element and a second sensing element configured to provide operational data of the first and second motor to the control unit, wherein the operational data comprises a first position of the first motor along the first frame section and a second position of the second motor along the second frame section, and wherein the control unit adjusts speeds of the first and second motors independently to adjust the first and second positions.

2. The sectional door operator system according to claim 1, wherein the first and second sensing elements are position sensors or encoders.

3. The sectional door operator system according to claim 1, wherein the first sensing element is arranged in conjunction with the first motor and the second sensing element is arranged in conjunction with the second motor.

4. The sectional door operator system according to claim 1, wherein the control unit is configured to control the operation of the drive unit by:

receiving operational data relating to the first position;

receiving operational data relating to the second position; and evaluating said received operational data, and based on said evaluation, independently control the operation of one or more of the first motor and the second motor.

5. The sectional door operator system according to claim 4, wherein the step of controlling the operation of one or more of the first motor and the second motor comprises altering the speed of the first motor or the second motor.

6. The sectional door operator system according to claim 4, wherein the step of evaluating said received operational data comprises determining if there is a deviation between the operational data of the two motors that is above a maximum deviation threshold.

7. The sectional door operator system according to claim 6, wherein if there is a deviation, the speed of the first motor or the second motor is altered and else the speed of the first motor and the second motor is maintained.

8. The sectional door operator system according to claim 6, wherein if it is determined that there is a deviation in the first position of the first motor and the second position of the second motor it is determined which of the motors that are the furthest away from a target position, and wherein if the second motor is determined to be further away from the target position than the first motor, the speed of the first motor will be reduced and if the first motor is determined to be further away from the target position than the second motor, the speed of the second motor will be reduced.

9. The sectional door operator system according to claim 1, wherein control unit is further configured to determine if first and second positions of the first and second motors are equal to a target position, and if so the control unit is configured to stop the operation of both motors.

10. The sectional door operator system according to claim 1, wherein at least one of the first and the second motor of the drive unit are direct current (DC) motors.

11. The sectional door operator system according to claim 10, wherein the at least one of the first and second motor are brushless direct current (BLDC) motors.

12. The sectional door operator system according to claim 1, wherein the first and second motor of the drive unit each comprises an electromagnetic brake arranged to control the movement of the door when it is moved from the open position (O) to the closed position (C).

13. The sectional door operator system according to claim 1, further comprising a third drive unit comprising a third motor and a fourth drive unit comprising a fourth motor each mounted on another section of the plurality of sections, wherein the third drive unit comprises a third pinion gear that is engaged with and moveable along the first rack, wherein the fourth drive unit comprises a fourth pinion gear that is engaged with and moveable along the second rack and arranged to assist the first and second drive units when moving the door from the closed position (C) to the open position (O), and wherein the third and fourth drive units are connected to the control unit.

14. A sectional door operator system for opening and closing an opening, comprising:

a door arranged to be moved between an open (O) and closed (C) position and comprising a plurality of horizontal and interconnected sections, a door frame comprising a first frame section affixed with a first side of the opening and a second frame section affixed with a second side of the opening, wherein the plurality of horizontal and interconnected sections are moveable along the door frame, a first drive unit mounted on a horizontal section of the plurality of horizontal and interconnected sections and engaged with and moveable along the first frame section, a second drive unit mounted on the horizontal section and engaged with and moveable along the second frame section, wherein the first drive unit and the second drive unit are arranged to move the sectional door from the closed position (C) to the open position (O), wherein the first drive unit comprises at least a first motor and the second drive unit comprises at least a second motor and wherein the first motor and the second motor are mounted on opposite sides of the horizontal section adjacent the respective first and second frame sections, and wherein the first and second motors rotate independently, a control unit being in operative communication with the first and second drive units and configured to control the operation of the first and second motors, and at least a first sensing element and a second sensing element configured to provide operational data of the first and second motor to the control unit, wherein the operational data comprises a first position of the first motor along the first frame section and a second position of the second motor along the second frame section, and wherein the control unit adjusts speeds of the first and second motors independently to adjust the first and second positions.

* * * * *